US005275379A

United States Patent [19]

McAleer

[11] Patent Number: 5,275,379

[45] Date of Patent: Jan. 4, 1994

[54] WILDCAT CHAIN HOIST WITH WHELPS, POCKETS, AND MOVABLE DRUM HALVES

[76] Inventor: Roger W. McAleer, 4322 Woodway St., Alexandria, Va. 22312

[21] Appl. No.: 835,405

[22] Filed: Feb. 14, 1992

[51] Int. Cl.[5] ........ B66D 1/72; B63B 21/16; F16G 13/12

[52] U.S. Cl. ........ 254/372; 254/286; 114/293

[58] Field of Search ........ 254/286, 368, 371, 372, 254/373, 374, 390, 391, 226; 114/294, 243, 293; 410/101, 103, 105; 474/8, 9, 47, 48, 49

[56] References Cited

U.S. PATENT DOCUMENTS

| | | | |
|---|---|---|---|
| 36,087 | 8/1862 | Harfield | 254/372 X |
| 938,174 | 10/1909 | Shaw | 254/371 |
| 3,250,514 | 5/1966 | Hamalainen | 474/8 X |
| 3,396,514 | 8/1968 | Schorp | 474/8 |
| 4,034,556 | 7/1977 | Riber | 114/294 X |
| 4,070,981 | 1/1978 | Guinn et al. | 254/372 X |
| 4,273,486 | 6/1981 | Tatina | 410/103 |
| 4,466,598 | 8/1984 | Eggleton et al. | 254/372 X |
| 4,504,022 | 3/1985 | Stang | 474/47 X |
| 4,520,999 | 6/1985 | Phillips | 254/278 |
| 4,575,050 | 3/1986 | Bechmann | 254/286 |
| 4,646,805 | 3/1987 | Dohmeier | 152/172 |

*Primary Examiner*—Clifford D. Crowder
*Assistant Examiner*—Ismael Izaguirre
*Attorney, Agent, or Firm*—Dickman, III: John B.

[57] ABSTRACT

A wildcat chain hoist for lifting anchor chain where the chain length may have different size chain links. The wildcat chain hoist continuously lifts the chain regardless of the different link sizes by engaging alternate chain links defined as horizontal links and applying a pulling force to them. The wildcat chain hoist includes a drum constructed of two identical halves having whelps for guiding the vertical links. The halves are joined together to provide a v-shaped cross section. There are pockets extending from the drum hub up to the perimeter with the pockets increasing in size toward the perimeter to gage and guide the chain links into the proper pocket size. Each wildcat chain drum half has a flange rim which moves or adjusts to close the pockets on the chain links to pull on the chain, and to open to release the chain.

9 Claims, 3 Drawing Sheets

WILDCAT CHAIN HOIST WITH WHELPS, POCKETS, AND MOVABLE DRUM HALVES

BACKGROUND OF THE INVENTION

This invention relates to chain winches of the type for handling anchor chain, and in particular to a chain winch for handling different size anchor chains.

Historically, ships carry only one size anchor chain, not necessarily because of the strength requirements throughout the entire cable length, but rather, because heretofore an anchor chain wildcat could accomodate only one specific chain size. Many ships carry throughout their service life nonessential tons of weight in their chain lockers with attendant loss of useful payload and propulsive power.

Chain, such as anchor chain on ships, is customarily hoisted by a power source developing a rotational force. This force is transmitted to the chain by a specifically configured drum type device called a wildcat secured to the rotating power shaft. The configuration of the wildcat is specifically shaped to the particular size and diminsions of the chain to be handled. The shape consists of whelps or "dogs", which intersperse themselves between the horizontal links (chain having a vertical link alternating with a horizontal link) and which apply force to the rear of each horizontal link as it enters the wildcat. Between the whelps are "pockets" shaped to the dimensions of the horizontal links. These pockets keep the chain at a fixed radius about the power shaft centerline which is based upon the chain link length. If another size chain, having links of different length and width from that for which the wildcat was specifically designed is used, power cannot be effectively applied without having a new and differently shaped wildcat secured to the power shaft.

There are situations where the lifting of a length of chain having different sizes in that length is required. This has been usually accomplished through gripping the chain by a hook from a crane or other lifting device, and through a series of staged lifts in which the hook is reattached down the chain a number of times, the entire chain length being raised. This method is not only time consuming but requires labor personnel placed in a hazardous position.

The following patents are directed to chain hoists where alternated chain links are engaged by whelps of sprocket teeth to lift the chain:

U.S. Pat. No. 2,548,846, issued to Robins et al
U.S. Pat. No. 3,507,471, issued to Haynes et al
U.S. Pat. No. 4,034,556, issued to Riber
U.S. Pat. No. 4,646,805, issued to Dohmeier While these patents show chain hoists and positive chain link engagement, there is no showing of a wildcat drum to handle a length of chain having different size links. The present invention overcomes the showing of the prior art.

SUMMARY OF THE INVENTION

Through the use of a unique wildcat shape, chain of different sizes can be accomodated, providing a continuous lift effectively and without personnel involvement at the lift scene.

This special wildcat has a generally V-shaped cross-section with whelps and pockets for each size chain. The pockets may contain steps, or lands for each chain size. The horizontal links will penetrate the pockets until their width contacts the same width of the pocket and resides on the step, or land proper for its size in that configuration. The chain link is restrained at that radius about the shaft centerline required for the specific size of chain, and the horizontal link is kept in a horizontal position so that the whelps can apply force equally on each side of the link. Link lengths and widths dictate that each size chain can only enter the correct pocket. The whelps between the pockets are also V-shaped in cross-section to permit the entry of the vertical axis links between the pocket, this space becomes reduced as the chain link size becomes smaller. In elevation, the whelps and pockets will each have lengths to fit the vertical axis links, respectively. The steps, or lands, in the pockets will be so located from the power shaft centerline that for each chain link size the whelp length plus the pocket length is a constant portion of the wildcat perimeter.

In one embodiment of the invention the wildcat has two flanges. To obtain sufficient area of whelps in contact with a power link to apply the force required to lift the chain in the power portion of the wildcat (dividing the wildcat into quadrants, the power portion is usually in quadrant I, or slightly sooner), and at the same time eliminate interference between the whelp and a horizontal link either entering or leaving its assigned pocket radius, the axis of each flange is slightly skewed so that the whelps are close to their working position in say quadrant I, and opened in quadrant III. The skewing of the flanges can be accomplished in a variety of ways; by universal joints, ball and sockets, eccentric cams, power split to each of the two wildcat flanges, splines, etc. The whelps are opened in that portion of the perimeter wherein they do no useful work, and would otherwise prohibit the various sized chain from entering or leaving their assigned radii. The skew angle between the wildcat flanges can be adjusted to optimise whelp load bearing area vs. chain/whelp clearance.

In another embodiment, the area of whelp-link contact required to apply the force to lift the chain and at the same time, eliminate interference between the whelps and any horizontal link either entering or leaving its assigned pocket can be obtained by a one piece wildcat where the link pockets on each flange are made slightly longer than the link length to accomodate horizontal link entry to its assigned pocket, and , by use of a chain "stripper" shaped to provide a "tilt" to the horizontal link being relieved of its load, the tilt permitting exit from the wildcat by narrowing width of the unloaded link for passage through the whelp.

Still another embodiment shows a multi-piece wildcat in which the whelps are independent from the flange, eliminating whelp/chain interference. The whelps are spring loaded to a retracted position except in that segment of the perimeter where they must apply force to the chain. In that area the spring is overpowered by an electric cam located on the wildcat foundation outside of each flange. These cams would force the whelps inward thus contracting the horizontal links and applying the rotational force. This arrangement although the most complicated affords the largest load carrying area of link-whelp contact and the greatest latitude in selecting where the power to the chain is applied.

Links connecting different sizes of chain must be longer than the length of the smaller links due to the necessity of either increasing or decreasing the radius of the new chain about the shaft axis. This can be accomplished by the use of standard chain detachable links of a size selected to match the sizes of chain being connected. As these detachable links differ in width and thichness from the regular links, it is preferable that these links pass through the wildcat in the vertical position. This can be insured by appropriate marking of the links, analagous to color coding of electric wire to establish the correctness of electrical connections.

DESCRIPTION OF THE INVENTION

Figure 1:
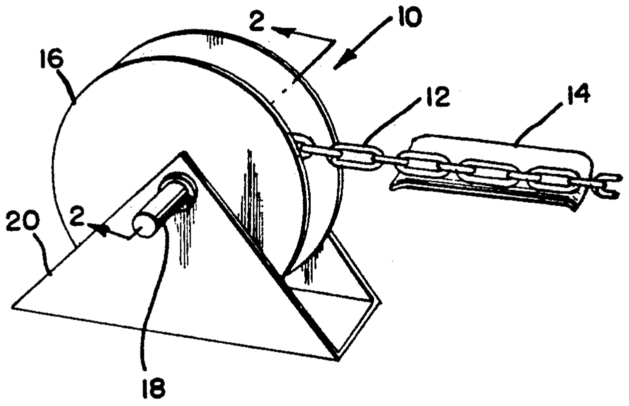
FIG. 1 is a perspective view of a wildcat chain hoist of the invention.

Referring to the drawings FIGS. 1-7, there is shown in FIG. 1 a chain hoist 10 which can be used to raise anchor chain 12. The anchor chain 12 maybe payed over a chain guide 14 to properly align the chain with a wildcat drum 16. The chain hoist 10 is driven by a rotation power source, not shown, connected to a driven shaft 18. The entire assembly is mounted on a support 20.

Figure 2:
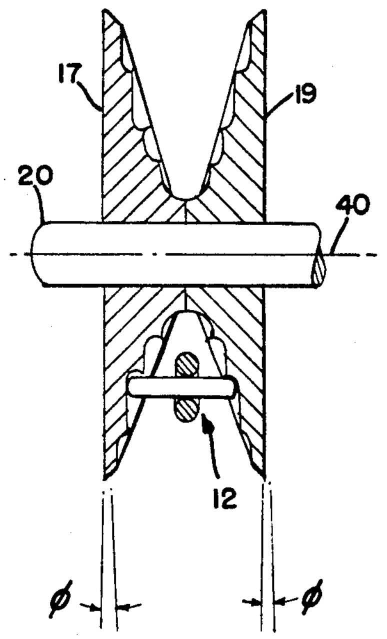
FIG. 2 is a front view in cross-section of a wildcat of the invention taken along the line 2—2 of FIG. 1.
Figure 3:
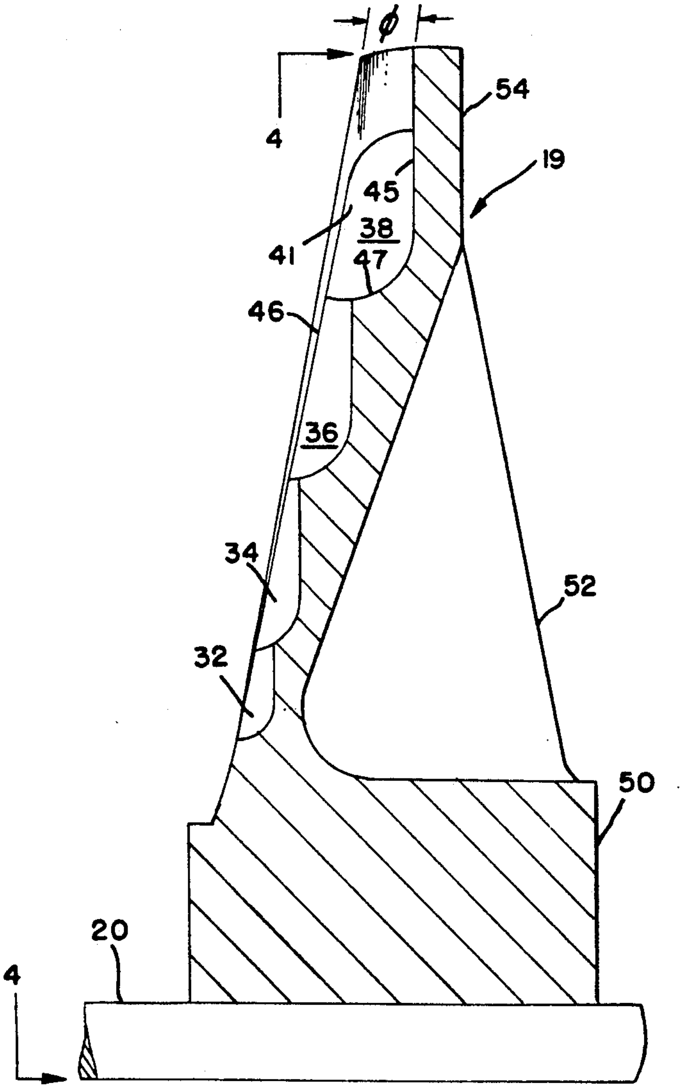
FIG. 3 is a partial cross-section view of a wildcat of the invention.
Figure 4:
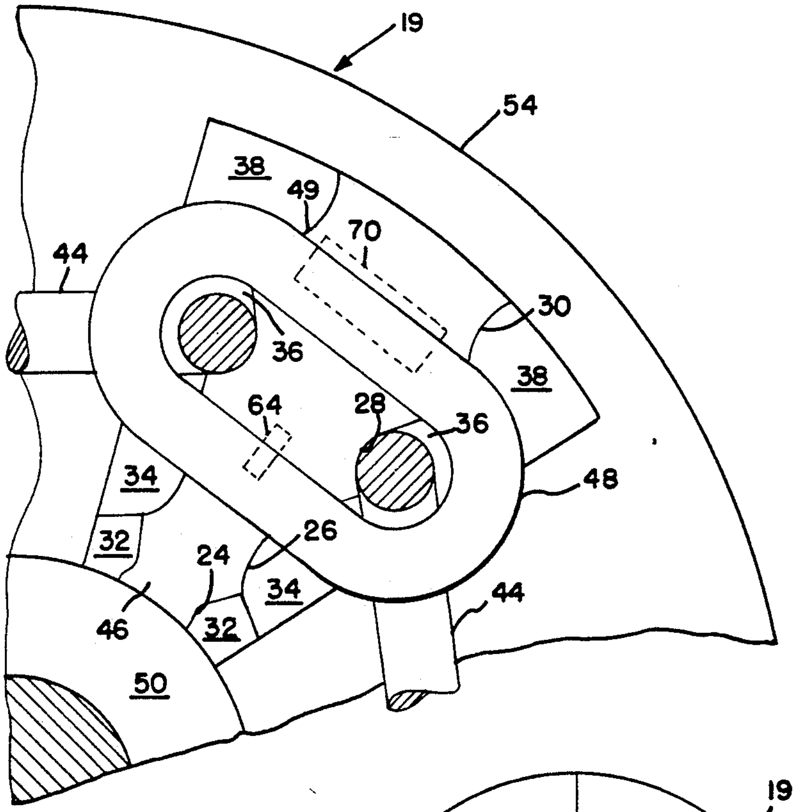
FIG. 4 is a partial front face view of a retractable whelp configuration taken along the line 4—4 of FIG. 3.

The wildcat drum 16 as shown in FIGS. 2 and 3, mounted on shaft 20. The drum half 19, shown in FIG. 4, has a plurality of steps or lands, 24, 26, 28, and 30, respectively. Each step of land starting with step 26 is progressively larger than the proceeding step. In other words, step 24 handles $\frac{3}{4}$ inch links; step 26, 1 inch links; step 28, $1\frac{1}{2}$ inch links and step 30, 2 inch links. The steps 24 to 30 are shown in FIG. 4 as part of corresponding pockets 32, 34, 36 and 38, respectively. These steps 24 to 30 dictate the radius about the shaft 40 that each chain size, for example $\frac{3}{4}$ to 2 inch as shown, must fit. Additionally, the steps or lands, 24 to 30 insure that the chain links which are alternately defined for the purposes of identification as horizontal or vertical, insure that the horizontal links 44 are kept horizontal so that whelps 46 can apply force equally on each side of a link. The force applied is generated by the wildcat drum halves 17 and 19 rotating together with the corresponding sized pockets being matched to form completed pockets 32 to 38 in which horizontal link 44 slips into a pocket 36, FIG. 4 and the steps of land 28 abuts against the rear of the link. Link lengths and widths dictate that each size chain can only enter the correct pocket for itself. The whelps 46, the V-shaped section between the pockets 32 to 38, permit the entry of the vertical links 48. The whelps 46 are shown in FIG. 2 in cross section forming a V-shape extending perpendicularly outward from the shaft 20 to permit the entry of vertical links between the pockets, this space reduces as the chain link size becomes smaller.

When the pocket halves are joined together by the joining of the drum halves 17 and 19, the pockets have side walls 45, a bottom wall 47 and an arcuate end wall 49. The arcuate end wall 49 is the step, or land 30, shown best in FIG. 4. While only one pocket 38 in FIG. 3 is shown with side walls, a bottom wall and an end wall, pockets 32 and 38 have similar walls.

Figure 3A:
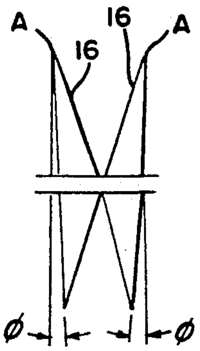
FIG. 3*a* is a schematic of the wildcat of FIGS. 3 and 4 skewed.
Figure 3B:
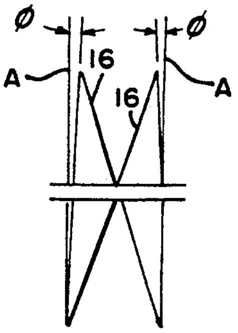
FIG. 3*b* is a schematic of the wildcat of FIG. 3*a* with the wildcat rotated 180 degrees.
Figure 5:
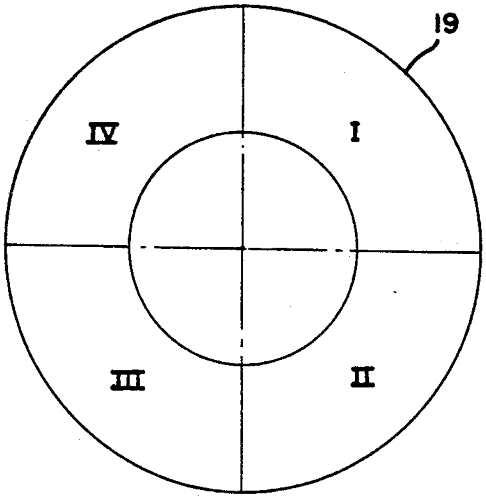
FIG. 5 shows a schematic front view of a wildcat divided into quadrants.

The wildcat halves 17 and 19 form the drum 17, only half 19 being shown in FIGS. 3 and 4, having a generally V-shaped cross-section on a shaft hub 50 and braced with a web 52. The axis of the wildcat includes an integral flange 54 that is slightly skewed by the angle $\phi$ so that the whelps 46 (FIG. 2) are closed in the gripping position. FIG. 3*a* shows the wildcat 16 skewed on shaft 20 at an angle $\phi$ to the vertical line A and closed. Whereas in FIG. 3*b* the angle $\phi$ shows the whelp 46 opened. A front view of wildcat 16, FIG. 5, shows the drum half 19 divided into quadrants where when angle $\phi$ of FIG. 3*a* represents the closed position of whelps 46 in quadrant I, and in FIG. 3*b* angle $\phi$ represents the open position of the whelps. The wildcat flange 54 has an angle $\phi$, FIG. 3, which can be provided by a variety of mechanical means including, not shown, a universal joint, a ball and socket, an electric cam, or a power split to each of the two wildcat flanges 54. It is important to open the whelps 46 in that portion of the perimeter or wildcat flange 54 wherein no useful work is performed, that is where a chain is not gripped, and would otherwise prohibit the various sized chain from entering or leaving the assigned pocket and step radaii. The skew angle between the wildcat flanges can be adjusted to optomize whelp load bearing area vs. chain whelp clearance.

In use, anchor chain which may have several different size chain links is positioned in the wildcat drum 16 with horizontal links 44 fitting in the proper pockets, on drum halves 17 and 19 which in FIG. 4 are pockets 36. The ends of the two horizontal links 44 engage the pocket seats, or lands 28, to dictate the radius of the wildcat drum each sized chain will fit. The alternate vertical link 48 is received by whelp 46 in the area between pockets 36, whereby when the chain 12 is gripped between the wildcat drum halves 17 and 19 the vertical link 48 is positioned between the whelps 46. As the wildcat drum 16 rotates the skewed angle $\phi$ of the wildcat, flange 54 closes the whelp 46 to grip the chain in the quadrant I, FIG. 5, and as the drum 16 continued to rotate the skewed angle $\phi$ of the flange 54 opens in quadrant III. In the closed position, a length of chain 12 is payed through the drum 16 and released so that another length of chain can be gripped to lift the chain.

Figure 6:
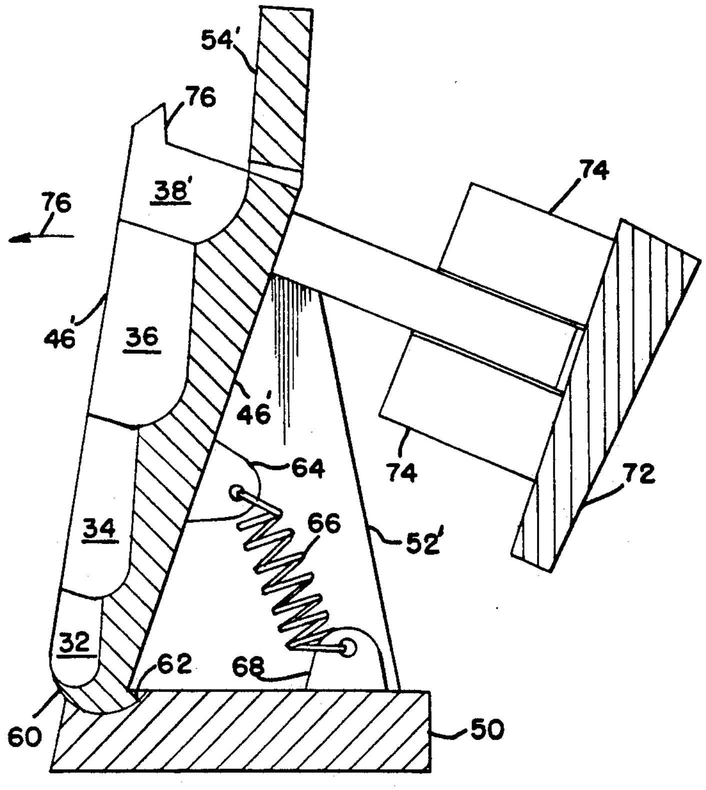
FIG. 6 is a cross-sectional view of another embodiment of the invention.
Figure 7:
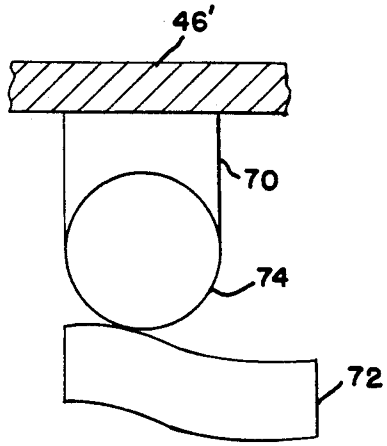
FIG. 7 is a side view of an eccentric cam of the invention taken along the line 7—7 of FIG. 6.
Figure 8:
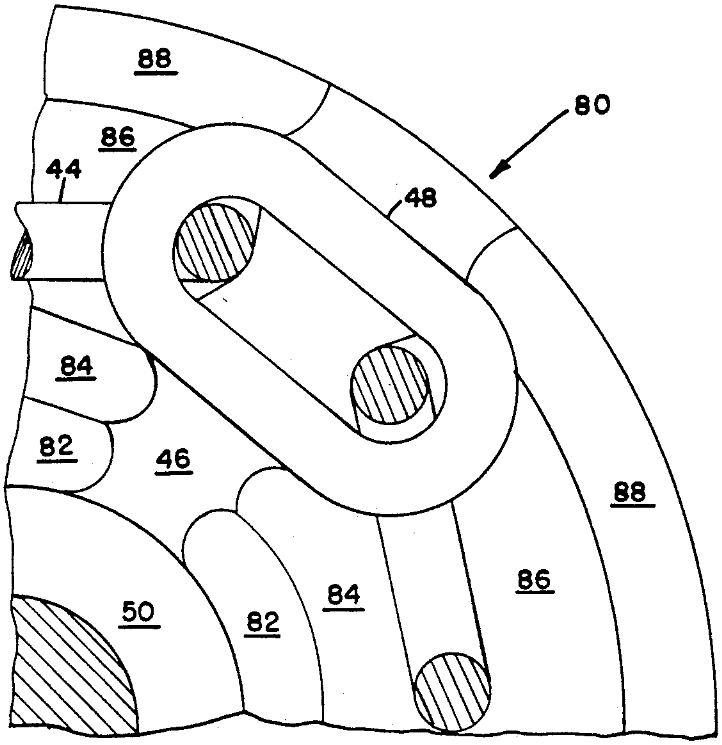
FIG. 8 is a partial front face view of another embodiment.

In the embodiment shown in FIGS. 6 and 7 each whelp 46' is pivotally mounted on flange 54'. The whelp 46' shown has an arcuate end 60 which pivots in arcuate recess 62 of flange 54'. Flange 54' has a support web 52' and a hub 50'. Whelp 46 has a spring connector 64 to which a spring 66 is attached at one end, and the other end of the spring 66 is attached to a second spring connector 68 on flange 54'. The spring tension keeps the whelp 46 retracted against the flange until a force is applied to whelp arm 70. The force is applied by an eccentric cam 72 when the rotating wildcat drum rotates whelp 46 past the cam 72. There are wheels 74 mounted on the arm 70 to roll over cam 72 pivoting the whelp 46' away from flange 54' in the direction of arrow 76. FIG. 7 shows the path of wheels 74 as they roll over the curved surface of cam 72. The cam 72 forces the whelp inwardly to contact the horizontal links in the proper pockets similar to chain links 44 and 48 of FIG. 4. Eccentric cams 72 are located on a stationary structure, not shown, of the chain hoist 10.

While only two embodiments of the invention have been disclosed, it is understood that other embodiments may be realized: therefore, the drawings, application and claims should be studied to fully understand the invention.

I claim:

1. A wildcat chain hoist for handling a length of chain of alternating horizontal and vertical links of more than one link size comprising:

a drum means having a hub means to mount said drum means on a rotatable shaft means, a pair of inclined faces radiating outwardly from said hub means to a pair of flange rims forming a v-shaped face on said drum means;

said v-shaped face on said drum means including a plurality of whelp means equally spaced to guide said vertical links of said chain length along said whelp means;

a plurality of pockets extending vertically along said v-shaped faces of said drum means and between each of said whelp means, said pockets increasing in size with said pocket size being smallest at said hub and largest at said pair of flange rims, each of side pockets having a pair of said walls, a bottom wall and a pair of end walls, whereby a horizontal chain link is guided by said vertical links moving on said whelp means to a pocket means having a length between said end walls of a length the same as said horizontal chain links to engage said horizontal chain links to lift said length of chain having links of more than one chain link size.

2. A wildcat chain hoist as in claim 1 wherein said pocket side-walls are parallel and said bottom wall being open.

3. A wildcat chain hoist as in claim 2, wherein said drum means having a first drum half and a second drum half.

4. A wildcat chain hoist as in claim 3 wherein said flange rim is skewed to close said wildcat drum halves against at least one horizontal chain link to hold the chain link in the proper size pocket, moving said chain length about said wildcat drum, and where said skewed flanged rims are opened to release the chain link.

5. A wildcat chain hoist as in claim 4 wherein a means is provided to skew said flange rims.

6. A wildcat chain hoist as in claim 5 wherein each of said drum halves having said plurality of whelp means extending to said flange rims where said whelp means is pivotally mounted on said flange rim, having a spring means to retract said whelp means against said flange rim, and means to move said whelp means into a closed position to engage a horizontal chain link.

7. A wildcat chain hoist as in claim 6 wherein said means to move said whelp means includes an arm projecting from said whelp means and having wheels to engage an eccentric cam mounted on a chain hoist stand.

8. A wildcat chain hoist as in claim 2 wherein said flange rim is skewed to close said wildcat drum halves against at least one horizontal chain link to hold the chain link in the proper size pocket, moving said chain length about said wildcat drum, and where said skewed flanged rims are opened to release the chain link.

9. A wildcat chain hoist as in claim 8 wherein a means is provided to skew said flange rims.

* * * * *